United States Patent
Gaither et al.

(10) Patent No.: US 11,571,974 B2
(45) Date of Patent: Feb. 7, 2023

(54) SYSTEMS AND METHODS FOR MOBILE CHARGING OF ELECTRIC VEHICLES

(71) Applicant: TOYOTA MOTOR ENGINEERING & MANUFACTURING NORTH AMERICA, INC., Plano, TX (US)

(72) Inventors: Geoffrey D. Gaither, Brighton, MI (US); Nathan C. Westover, New Hudson, MI (US); Josh D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 733 days.

(21) Appl. No.: 16/539,936

(22) Filed: Aug. 13, 2019

(65) Prior Publication Data
US 2021/0046829 A1 Feb. 18, 2021

(51) Int. Cl.
| | |
|---|---|
| *B60L 53/10* | (2019.01) |
| *B60L 53/65* | (2019.01) |
| *G01C 21/34* | (2006.01) |
| *B60L 53/80* | (2019.01) |
| *B60L 53/63* | (2019.01) |
| *B60L 53/53* | (2019.01) |

(52) U.S. Cl.
CPC ............ *B60L 53/10* (2019.02); *B60L 53/65* (2019.02); *B60L 53/80* (2019.02); *G01C 21/3438* (2013.01); *B60L 53/53* (2019.02); *B60L 53/63* (2019.02); *B60L 2240/545* (2013.01); *B60L 2240/68* (2013.01); *B60L 2260/32* (2013.01); *B60L 2260/54* (2013.01); *B66B 2201/234* (2013.01); *G05B 2219/32365* (2013.01)

(58) Field of Classification Search
CPC ............. B60L 2240/545; B60L 53/65; B60L 2240/662; B60L 53/80; G01C 21/3438; G05B 2219/32365
USPC .......................................................... 701/22
See application file for complete search history.

(56) References Cited

U.S. PATENT DOCUMENTS

| | | | |
|---|---|---|---|
| 9,868,421 B2 | 1/2018 | Hassounah | |
| 10,040,359 B2 | 8/2018 | Chen et al. | |
| 2012/0283902 A1* | 11/2012 | Kusumi | H01M 10/443 701/22 |

(Continued)

FOREIGN PATENT DOCUMENTS

WO WO 2012/78822 A1 6/2012

*Primary Examiner* — Charles A Fox
*Assistant Examiner* — Michael E Butler
(74) *Attorney, Agent, or Firm* — Oblon, McClelland, Maier & Neustadt, L.L.P.

(57) ABSTRACT

A method, a system, and a computer readable medium for managing recharging of a shared electric vehicle are provided. The method includes determining whether an energy storage device of the electric vehicle requires charging, identifying a charging method based on a plurality of parameters including an ambient temperature, a current state of charge, a current load, and a power estimate for a planned route, altering the planned route of the electric vehicle to enable charging based on the identified method, and charging a second energy storage device associated with a second electric vehicle during transit via the electric vehicle. The charging method includes swapping electric vehicles, exchanging the energy storage device, and charging via a charging bot.

17 Claims, 7 Drawing Sheets

(56) References Cited

U.S. PATENT DOCUMENTS

| | | | |
|---|---|---|---|
| 2015/0239365 A1* | 8/2015 | Hyde | B60L 58/26 |
| | | | 701/2 |
| 2016/0129793 A1* | 5/2016 | Cronie | B60L 53/126 |
| | | | 320/109 |
| 2017/0213137 A1* | 7/2017 | Geller | G01C 21/3469 |
| 2017/0267116 A1* | 9/2017 | Lindemann | B60L 53/66 |
| 2018/0107219 A1 | 4/2018 | Harris et al. | |
| 2018/0186357 A1 | 7/2018 | Deshpande et al. | |
| 2018/0281606 A1* | 10/2018 | Scherer | B60L 53/66 |
| 2018/0290561 A1 | 10/2018 | Baumgartner | |
| 2019/0009756 A1* | 1/2019 | Jacobs | B60S 5/00 |

* cited by examiner

SYSTEMS AND METHODS FOR MOBILE CHARGING OF ELECTRIC VEHICLES

BACKGROUND

Range extenders and drones are used to refuel autonomous vehicles. For example, an autonomous refueling drone may include a fuel storage area and be dispatched to vehicles needing refueling. U.S. Patent Publication No. 2018/0281606 A1 entitled "Method for coordinating charging processes of electric vehicles as well electrically operated motor vehicle and supply vehicle" by Scherer describes a method that optimizes transfer of energy from multiple mobile supplier units to multiple mobile procuring units.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for managing recharging of a shared electric vehicle that includes determining whether an energy storage device of the electric vehicle requires charging, identifying a charging method based on a plurality of parameters including an ambient temperature, a current state of charge, a current load, and a power estimate for a planned route, altering the planned route of the electric vehicle to enable charging based on the identified method, and charging a second energy storage device associated with a second electric vehicle during transit via the electric vehicle. The charging method includes swapping electric vehicles, exchanging the energy storage device, and charging via a charging bot.

The present disclosure also relates to a system for managing recharging of an electric vehicle. The system includes a charging bot, an energy storage device associated with the electric vehicle; and processing circuitry associated with the electric vehicle. The processing circuitry is configured to determine whether the energy storage device of the electric vehicle requires charging, identify a charging method based on a plurality of parameters including an ambient temperature, a current state of charge, a current load, and a power estimate for a planned route, alter the planned route of the electric vehicle to enable charging based on the identified method, and charge a second energy storage device associated with a second electric vehicle during transit via the electric vehicle. The charging method includes swapping electric vehicles, exchanging the energy storage device, and charging via the charging bot.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
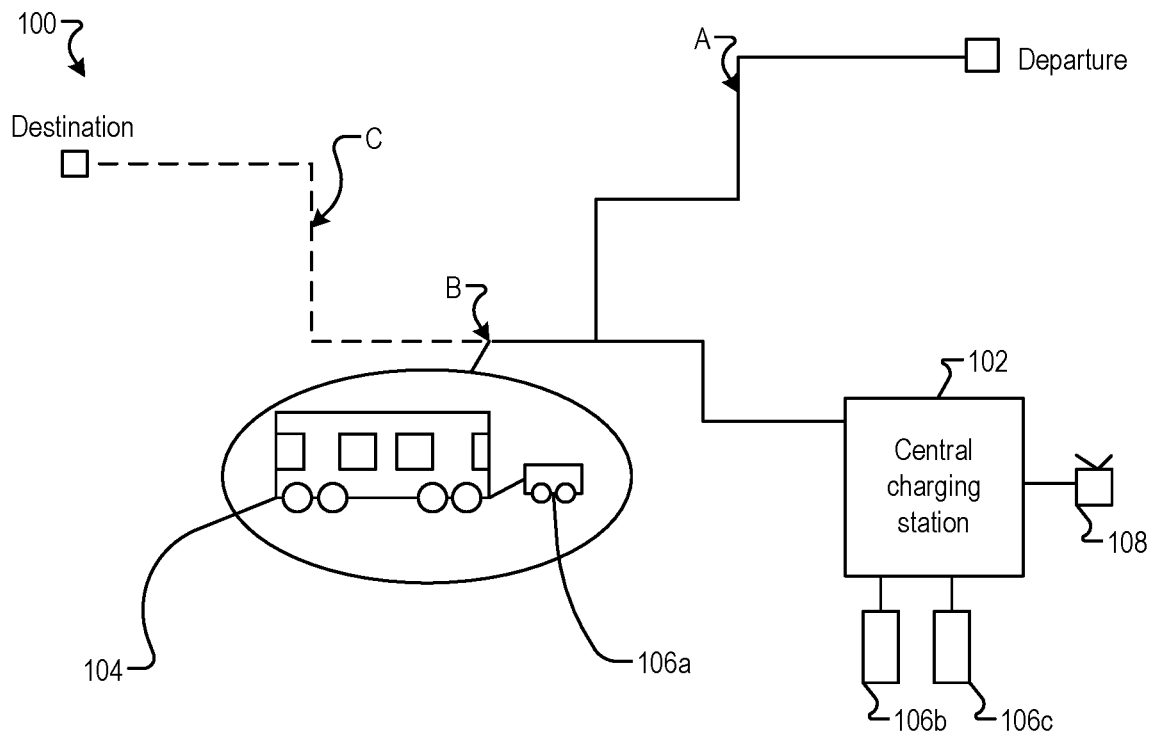
FIG. 1 is a schematic of a system environment according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a charging system and associated methodology for electrified mobility as a service platform. The methods and systems described herein manage charging of electric storage device associated with electric vehicles based on customer wait times, vehicle dwell times, and global and local energy efficiencies.

Figure 3A:
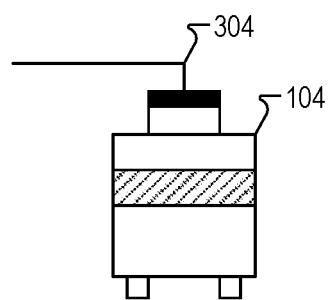
FIGS. 3A-3C show multiple charging techniques according to one example.
Figure 3B:
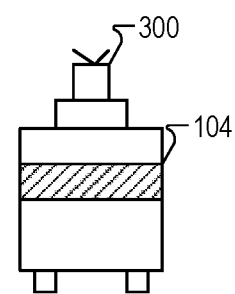
Figure 3C:
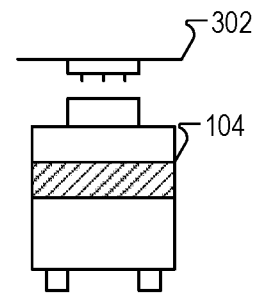

FIG. 1 is a schematic of a system environment 100 according to one example. The automated system/service provides recharges mobility as a service (Maas) electric vehicles (EVs). The system includes a central charging station 102, an electrical vehicle (EV) 104, and a plurality of charging bots 106. The electric vehicle 104 may be any type of vehicle such as a car, truck, bus, airplane, helicopter, motorcycle, train, or ship. The vehicle 104 may be actively operated by a driver or may be partially or completely autonomous or self-driving. The electric vehicle 104 is part of a system of shared electric vehicles. The electric vehicle 104 may receive request for rides from users. The charging bots may include a drone 108 and charging bots 106a, 106b, 106c. The EV 104 may be bi-directional (i.e., can move in either direction during a trip). Multiple charging techniques may be used as shown in FIGS. 3A-C. The EV 104 may be charged from the front, the rear, the side, or the bottom of the EV 104 without affecting the movement of the EV in either direction of the EV 104. At location A, as shown in FIG. 1, the EV 104 determines whether a current charge is sufficient to complete the current route. In response to determining that the current charge is insufficient to complete the current route, a controller of the EV 104 enables an enroute charge mode. A request may be sent to the central charging station 102.

The determination is made at the beginning of a trip based on a current state of charge (SOC), a current load, a location, an ambient temperature, an operating temperature, and power estimation for the remaining route and traffic. The EV 104 may request a charge bot 106. The time for the charge bot 106 to arrive at the moving location of the electric vehicle 104 is determined. In other words, the time needed for the charge bot 106 to arrive to an estimated location of the EV 104 is determined. The estimated location of the EV 104 is determined based on a planned route and current traffic conditions. The request is sent before the charge is depleted and factoring the determined time.

The charge bot 106a is dispatched from the central charging station 102. The charge bot 106a dispatched may or may not be fully charged. A commute route from the central charging station to the unit is determined based on traffic, route load, and dispense charge required.

Once the charge bot 106a arrives at the location of the EV 104 (location B in FIG. 1), the charge bot mates with the EV 104 and automatically speed matched based on V2V (vehicle to vehicle) communication with the EV 104 and GPS (global positioning system) data. The charge is initiated. The charge amount depends on a future service of the EV 104. The charge amount may be based on a planned next route, a dwell time, and infrastructure at or near route end. The charge bot 106a returns to the central charging station 102 when the charge is completed (e.g., at location C in FIG. 1). For example, the charge amount may correspond to the energy needed to complete a current trip when the electric vehicle will be idle after completing the current trip. The energy storage device may be fully charged when the planned next route does not include charging infrastructures (e.g., availability of charging rails, charging drones, and the like). The energy transferred from the charge bot 106a to the electric vehicle 104 may correspond to the charge needed for the electric vehicle to arrive at a specific charging location where the energy transfer may be faster or more economical. For example, the drone 108 may deliver energy to the electric vehicle 104 sufficient to reach an electric charging station.

In one example, drones are utilized to deliver charged energy storage devices (batteries) to enroute EVs 104. Direct and efficient low-altitude flight paths can enable quicker recharge times and more overall efficient energy usage. For example, the drone 108 may be dispatched to location B of the EV 104. The optimal drone may be identified from a plurality of drones available at the central charging station 102 based on a plurality of factors as discussed further below. The drone 108 includes an antenna for wireless communication with a dispatcher or a central computer. The drone 108 may also communicate with the EV 104 via V2V. The drone 108 includes a fuel storage area, a refill port (i.e., an electrical connector) configured to be connected to energy storage device of the EV 104. The drone 108 may also carry one or more charged energy storage devices (e.g., batteries) to deliver to one or more EVs 104.

Near full depletion of charge may be enabled when grid to vehicle charging is selected. The drone 108 has a predetermined minimal threshold corresponding to the charge needed to fly the drone off the top of the EV 104 and back to the central station charging 102. The drone 108 is charged from the grid. Then, the drone 108 provides vehicle-to-vehicle charging.

Figure 2:
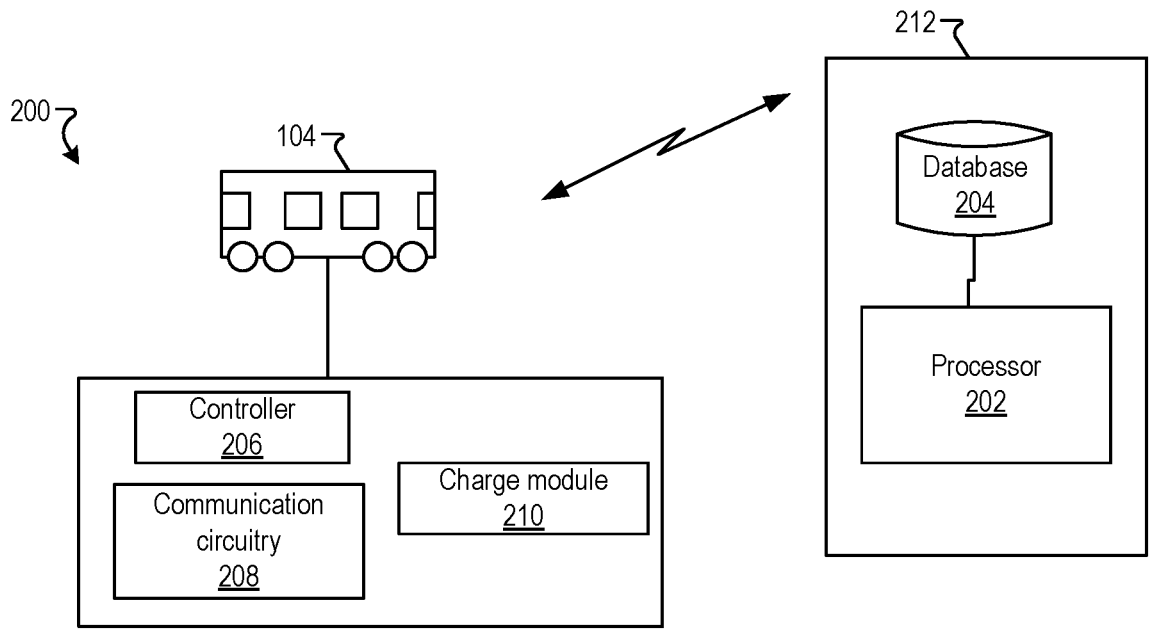
FIG. 2 is a schematic that shows a block diagram of the an electric vehicle and a central computer according to one example.

FIG. 2 is a schematic that shows a block diagram of the EV 104 and a central computer 212 according to one example. The central computer 212 includes a database 204 and a processor 202. The EV 104 includes a controller 206, communication circuitry 208, and a charge module 210. The central computer 212 may be associated with the central charging station 102.

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

As described previously herein, the EV 104 charging can be performed at any destination using drone or bot charge delivery. Using dwell time (i.e., waiting for a next assignment) optimizes vehicle use and charge throughput as very little energy is used during recharging. Further, the EV 104 may be redirected to the nearest infrastructure having charging capabilities compatible with the EV 104. Thus, charging during unoccupied transitions maximizes utilization rates with minimal impact to customers/users. The user does not experience in-ride charging. The EV 104 may charge during unoccupied transitions for example when the vehicle is moving from a drop-off location to a next pick up location. The EV 104 may alter the route during unoccupied transitions with minimal impact to the customer trip. The EV 104 charging may also be based on the time of the day. For example, the EV 104 may be charged for a longer period during nighttime when demand is lower (i.e., minimize interruptions) and utility may be cheaper.

The EV 104 and/or the central computer 212 may optimize the charging of the EVs 104 based on load information (e.g., expected number of riders) or time. For example, multiple drones may be used to recharge the EVs during period of high demand to minimize downtime. The central computer 212 may also identify the charging method to minimize the cost to the user. For example, charging using solar energy may be selected during daytime.

Multiple charging techniques may be used for bi-directional EVs 104. Charging techniques may include idle and non-idle charging techniques. For non-idle charging techniques the EV 104 is charged while moving based on the planned route. Catenary charging may be used as shown in FIG. 3A. The EV 104 is charged via rails 304. Drone charging may be used as shown in FIG. 3B. The EV 104 is charged via a drone 300. Wireless overhead charging may be used as shown in FIG. 3C. The EV 104 is charged using charging a pad 302.

Figure 4:
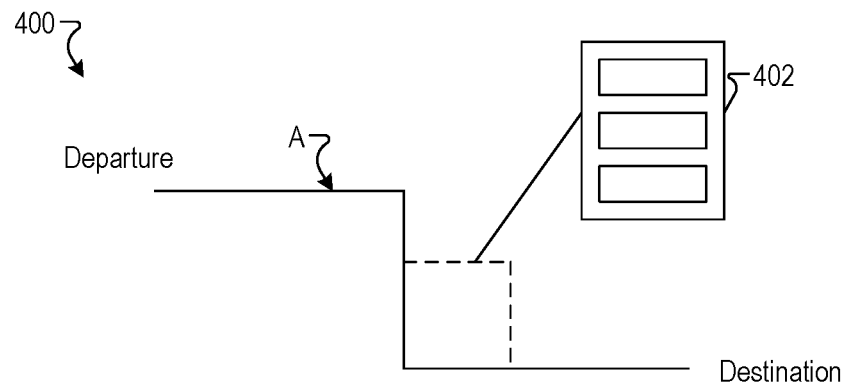
FIG. 4 is a schematic that illustrates battery exchange according to one example.

FIG. 4 is a schematic 400 that illustrates battery exchange according to one example. For smaller mobility platforms (e.g., e-scouters, e-bikes, and the like), the EV 104 may be redirected to a battery storage unit 402. The user may swap the empty (depleted) or near empty (depleted) energy storage device (e.g., battery) with a full charged battery from the battery storage unit 402. The users who alter their route to exchange batteries may be offered incentives (e.g., free ride, rewards, or reduced rate fare). For example, at location A in FIG. 4, the EV 104 may determine that a battery recharge is needed. The EV 104 is redirected to the battery storage unit 402. The change in the route is shown in dashed line in FIG. 4. The battery storage unit 402 may include multiple battery storage boxes. Each box may be unlocked using a smartphone of the user.

Figure 5:
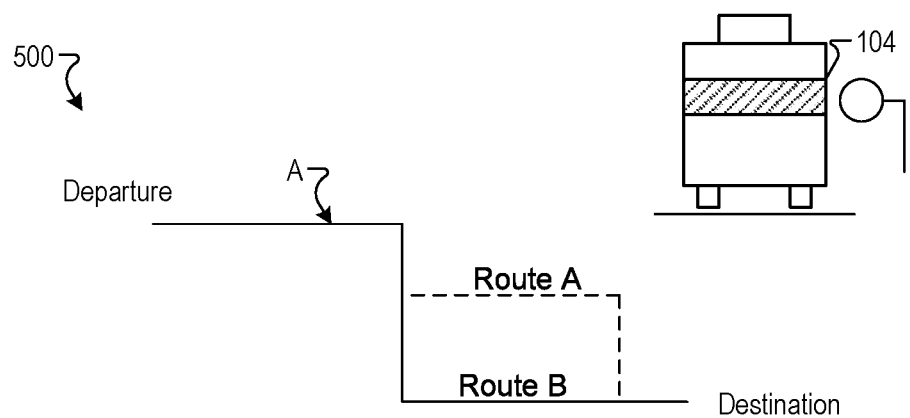
FIG. 5 is a schematic that illustrates altering a planned route for battery exchange at charging substations according to one example.

FIG. 5 is a schematic 500 that illustrates altering a planned route for battery exchange at charging substations according to one example. The planned route of the vehicle 104 is altered to follow a path with enroute charging potential. The enroute charging potential may include a path with either through-the-road wireless charging (rail or road surface) to support charging. For example, route A may include through the road wireless charging. Locations and types of charging are stored in the database 204 of the central computer or server 212. The location may be dedicated routes or lanes through the city.

Figure 6A:
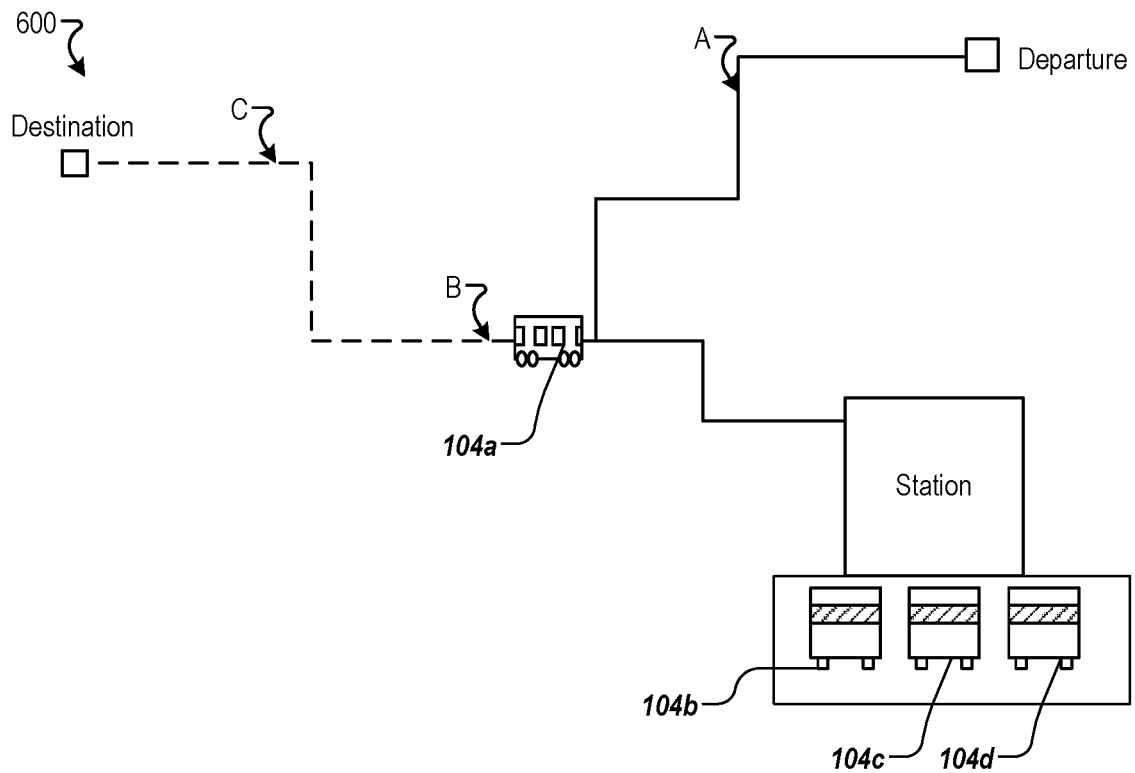
FIGS. 6A-6B are schematics that illustrate electric vehicles swapping according to one example.
Figure 6B:
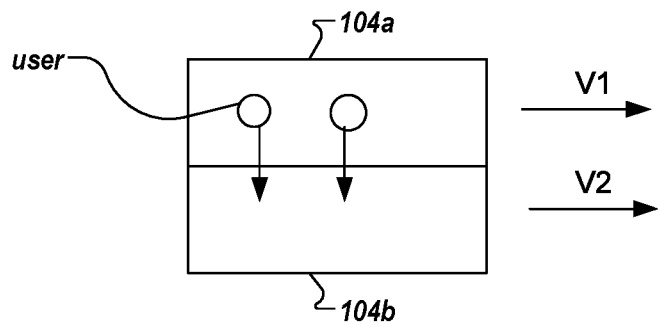

FIG. 6A is a schematic 600 that illustrates EVs swapping according to one example. The vehicle 104a may summons a new EV (i.e., new mass unit) in response to determining that there is insufficient charge to complete the route. The EV 104a and the new vehicle 104b couple allowing riders to transition from the near-depleted unit to the charged one as shown in FIG. 6B. The swap may be made when the EV 104a and 104b are not in motion or when the EVs are in motion and having synchronized speed. After all the riders transition to the new vehicle 104b, the near-depleted unit (i.e., EV 104a in FIG. 6A) goes to charge while the fully charged unit (e.g., 104b) completes the original route. The EV 104a may return to the central charging station 102. The EV 104a may also alter path toward a path having through the road wireless charging.

When Maas is coupled with last mile mobility services the user has their entire route/commute covered. By coupling the services, customers can disembark from the EV 104 and pick up their last mile solution (e-scooter) and get to their destination. The destination location may be modified to correspond with a location where last mile solution is available (e.g., e-scooter location).

The battery associated with the last mile solution may be charged enroute. In one example, a rider can bring a first mile solution to the EV 104, charges the battery associated with the first mile solution enroute, and utilizes the first mile solution as the last mile solution. Regenerated energy may be used to charge the last mile solution.

Figure 7:
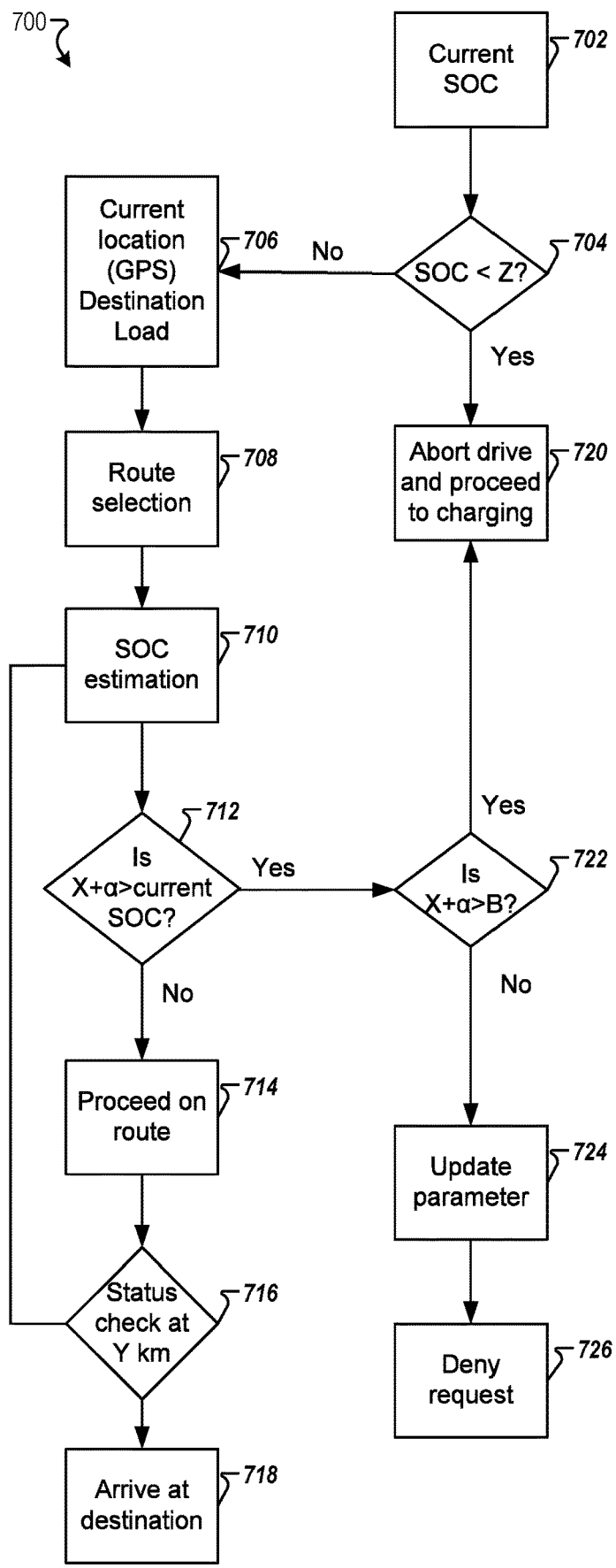
FIG. 7 is a flowchart for a charging process according to one example according to one example.

FIG. 7 is a flowchart for a charging process 700 according to one example. At step 702, the controller 206 determines and/or updates various parameters associated with the EV 104. For example, the controller 206 determines a current SOC, a current location, traffic information, weather information, current load information. Further, the controller 206 determines a load estimation. Weather information includes current weather information and estimated weather information. Traffic information includes current traffic information and estimated traffic information.

The location may include a start location, a destination location, and a current location. The SOC includes a SOC at the start of the trip, a current SOC, and an estimated SOC at the destination location. The load estimation includes a load at the start of the trip and a difference in the load after each expected stop (e.g., number of riders after each stop).

At step 704, the controller 206 determines whether the current SOC is below a threshold (Z). The threshold (Z) corresponds to the SOC required to reach the nearest charge station or to not power down before the charge bot and/or drone reaches the EV location. In response to determining that the SOC is below the threshold, the process proceeds to step 720. At step 720, the EV aborts the drive and proceeds to charging. In response to determining that the SOC is above the threshold, the process proceeds to step 706, the controller 206 updates the various parameters including a current location and the destination load.

At step 708, the controller 206 may identify a route to the destination.

At step 710, the SOC (X) is estimated. At step 712, the controller 206 may determine whether the estimated SOC (X) and a first parameter exceed the current SOC. The first parameter ($\alpha$) is a learned margin for SOC estimation accuracy under given conditions. In response to determining that the estimated SOC and the first parameter exceed the current SOC, the process proceeds to step 722. In response to determining that the estimated SOC and the first parameter do not exceed the current SOC, the process proceeds to step 714.

At step 714, the EV 104 proceeds on route towards the destination. Then, at step 716, the controller 206 may perform a check. For example, the check may be performed once a predetermined number of kilometers (Y) have elapsed. The controller 206 updates the various parameters and proceeds to step 710.

At step 722, the controller 206 determines whether the estimated SOC (X) and the first parameter exceed a second parameter (B). The second parameter (B) corresponds to a learned value for "mean" SOC required for local route completion. The controller 206 may use the second factor in determining whether the SOC is enough to satisfy a shorter route or not. In response to determining that the estimated SOC (X) and the first parameter exceed a second parameter (B), the process proceeds to step 720. In response to determining that the estimated SOC (X) and the first parameter do not exceed the second parameter B, the process proceeds to step 724.

At step 724, the controller 206 may update the various factors. Further, the controller 206 may determine whether enroute charging is available and/or whether a charging infrastructure is available. The factors may also include the charge time to sufficient charge and a battery replacement time.

At step 726, the controller 206 may deny the request. For example, the controller 206 may output a signal that the request is denied. Then, the controller 206 may look for another rider. For example, the status of the EV 104 may be updated to "available". Thus, the controller optimize for maximum availability by depleting the current charge until recharge is absolutely necessary. The needs for EVs in the area and requests from users are satisfied.

Although the flow charts show specific orders of executing functional logic blocks, the order of executing the block blocks may be changed relative to the order shown, as will be understood by one of ordinary skill in the art. Also, two or more blocks shown in succession may be executed concurrently or with partial concurrence.

The description herein is provided with reference to the system being located and implemented by the EV 104. However, it is to be understood that the system may alternatively or additionally be implemented within the central computer 212. Further, in some embodiments, the system may be implemented as an application that may be downloaded on a mobile device of a user of the EV 104.

Figure 8:
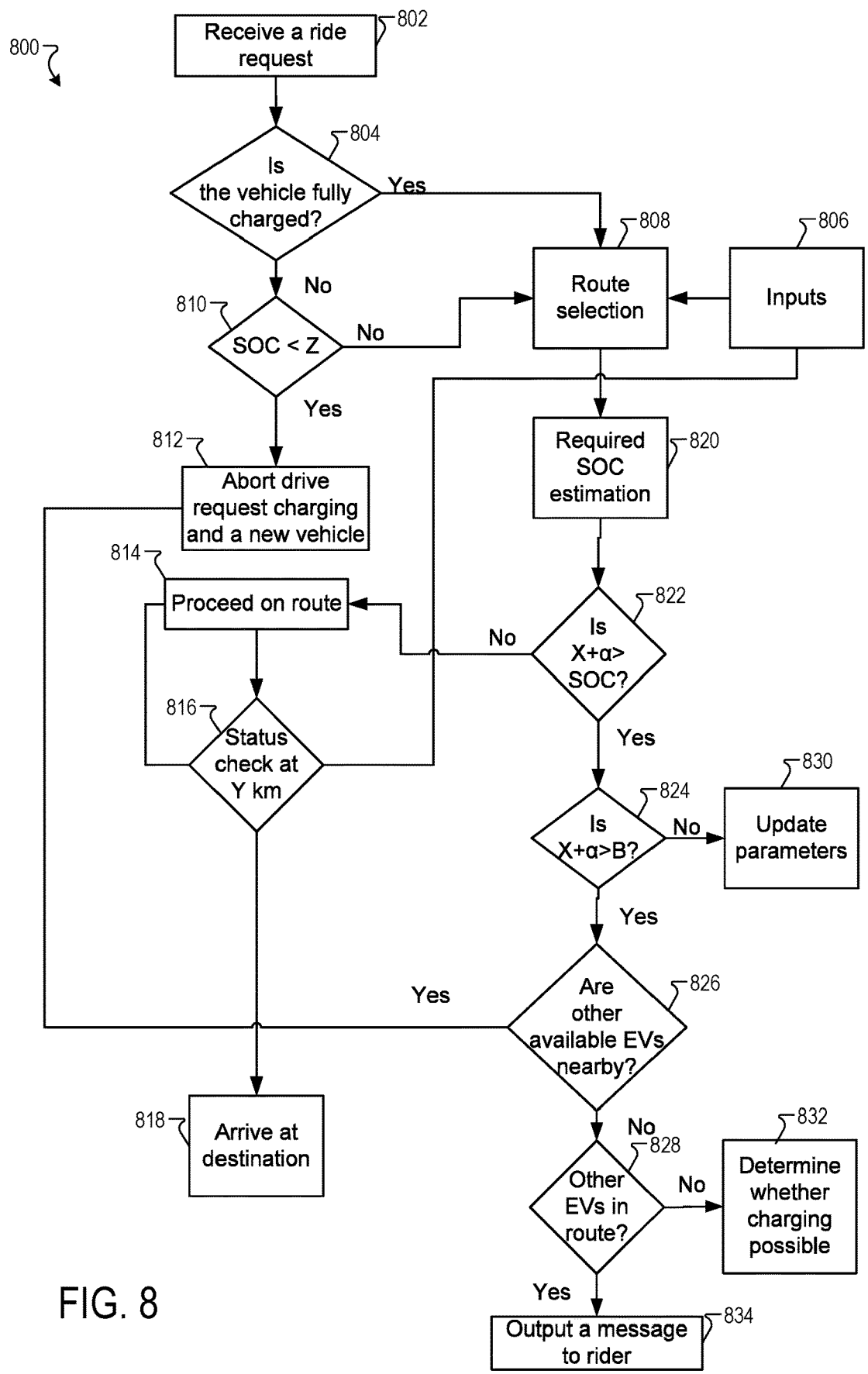
FIG. 8 is a flowchart for a charging process according to one example.

FIG. 8 is a flowchart for a charging process 800 according to one example. At step 802, the controller 206 may receive a ride request. In one example, the central computer 212 may receive the ride request and send a signal indicating the ride request to the EV 104.

At step 804, the controller 206 determines whether the EV 104 is fully charged. In response to determining that the EV is fully charged the process proceeds to step 808. In response to determining that the EV is not fully charged, the process proceeds to step 810.

At step 810, the controller 206 determines whether the state of charge of the EV is below the threshold (Z). In response to determining that the state of charge is below the threshold, the process proceeds to step 812. In response to determining that the SOC is not below the threshold, the process proceeds to step 808.

At step 808, the controller 206 may identify a route to the destination. The controller 206 may receive a plurality of inputs determined at step 806. For example, the plurality of inputs may include a current location, a current SOC, current traffic conditions, current weather conditions, current load, and destination information.

At step 820, the controller 206 determines an estimation of the SOC required to complete the ride request.

At step 822, the controller 206 determines whether the estimated SOC (X) and a first parameter exceed the current SOC. The first parameter ($\alpha$) is a learned margin for SOC estimation accuracy under given conditions. In response to determining that the estimated SOC and the first parameter exceed the current SOC, the process proceeds to step 824. In response to determining that the estimated SOC and the first parameter do not exceed the current SOC, the process proceeds to step 814.

At step 824, the controller 206 determines whether the estimated SOC (X) and the first parameter exceed the second parameter (B). The second parameter corresponds to a learned value for "mean" SOC required for local route completion. The controller 206 may use the second factor in determining whether the SOC is enough to satisfy a shorter route or not. In response to determining that the estimated SOC (X) and the first parameter exceed a second parameter B, the process proceeds to step 826. In response to determining that the estimated SOC (X) and the first parameter do not exceed the second parameter B, the process proceeds to step 830. At step 830, the controller 206 may update the various factors. Further, the controller 206 may determine whether enroute charging is available and/or whether a charging infrastructure is available. The factors may also include the charge time to sufficient charge and a battery replacement time. The controller 206 may wait for another ride request that satisfies the current criteria. The controller 206 may perform a wait for a predetermined period of time (e.g., 1 minute, 2 minutes, 5 minutes, 10 minutes, or the like) before accepting another ride request. As described herein, the second parameter B is updated and learned (using artificial intelligence) such that appropriately charged vehicles are readily available.

At step 826, the controller 206 determines whether other EVs are available in a predetermined perimeter. For example, the controller 206 may send a request to the central computer 212 requesting a list of the EVs available within a predetermined perimeter of the EV.

In response to determining that there are other available EVs within a predetermined perimeter of the EV, the process proceeds to step 812. In response to determining that there is no other EV within the predetermined perimeter, the process proceeds to step 828.

At step 828, the controller 206 determines whether other EVs are in route. In response to determining that there are other EVs in route, the process proceeds to step 834. At step 834, the controller outputs a message to the rider indicating the expected wait time and whether a ride-share is possible. Then, the controller may wait for a response from the rider. If the controller receives an acknowledgment, the controller adds the rider or the new route to the itinerary of a new vehicle associated with the EV in route. The controller of the new vehicle then proceeds to step 706 of FIG. 7.

In response to determining that there is no other EVs in route, the process proceeds to step 832. At step 832, the controller determines whether recharging is possible. The controller determines whether the estimated SOC (X) and the first parameter exceed a third parameter (C). The third parameter (C) is enough energy for the EV to travel an appreciable distance (and consume an appropriate amount of time) to allow a drone (or other charging mechanism) to arrive with en-route charging. In response to determining that the estimated SOC (X) and the first parameter exceed the third parameter (C), the process proceeds to step 814. The controller sends an output message to request charging (e.g., request drone charging). In response to determining that the estimated SOC (X) and the first parameter does not exceed the third parameter (C), the controller controls the EV to go to charging and outputs a message to the rider indicating an expected waiting time.

At step 812, the EV 104 aborts the drive. The controller 206 may output a signal to the central computer 212 including a request for charge and a new EV to complete the ride request.

At step 814, the EV 104 proceeds on route. At step 816, the controller 206 may perform a status check after the predetermined number of kilometers (Y) has elapsed. The predetermined number of kilometers may be a function of a total route length or a fixed value. The predetermined number (Y) may be a function of current load, weather conditions, and/or traffic conditions. The predetermined number may be determined using artificial learning techniques (e.g., using neural network techniques, support vector machines, Bayesian networks, and the like).

Figure 9:
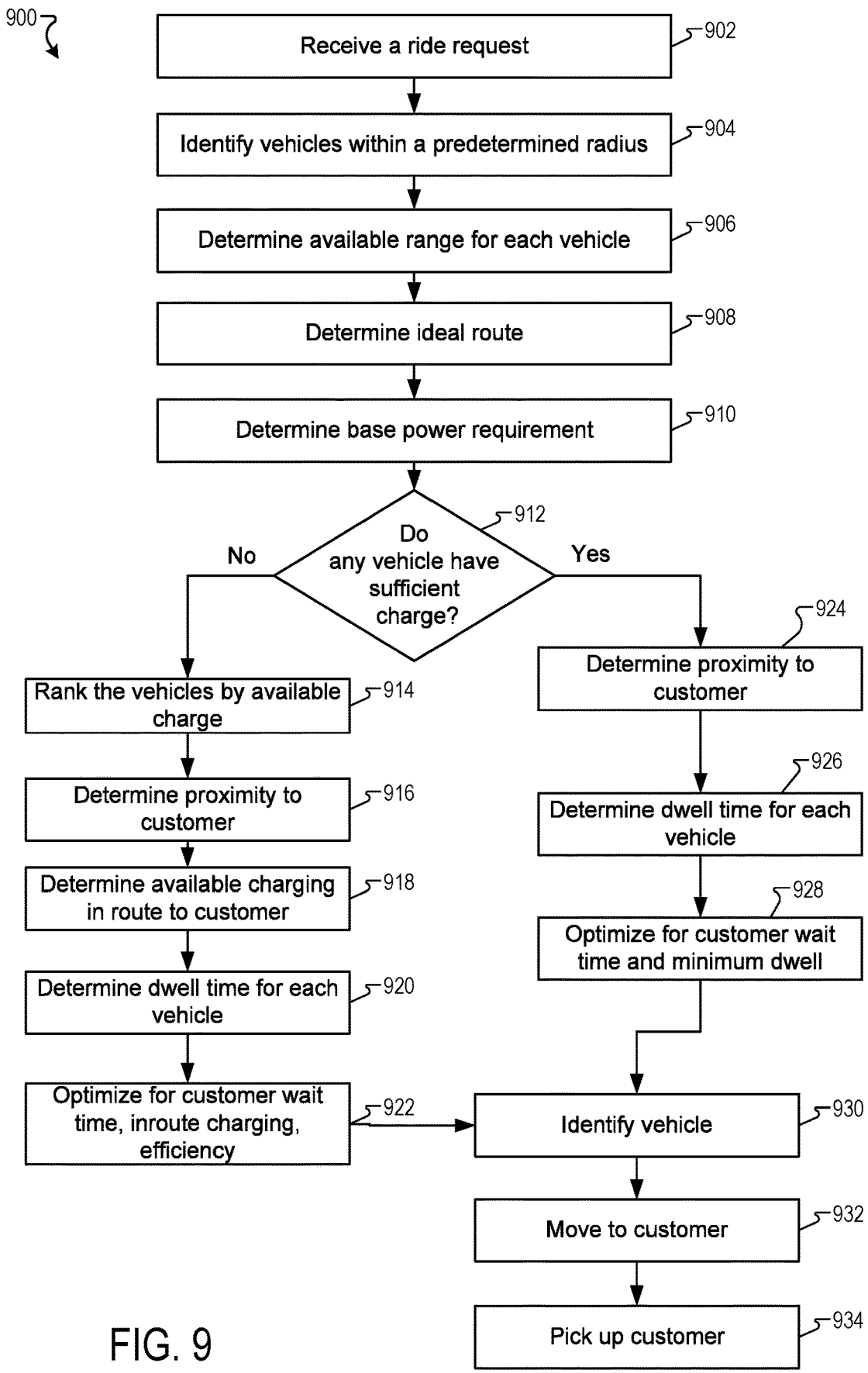
FIG. 9 is a schematic that shows a ride planning process according to one example.

FIG. 9 is a schematic that shows a ride planning process 900 according to one example. At S902, a ride request is received. The ride request includes a destination. The ride request may also include load information. Traffic information, weather information, and toll information are retrieved based on the destination. For example, weather information are retrieved from a third-party database.

At S904, the processor identifies vehicles located within a predetermined radius of the departure location. In response to determining that there is no available vehicle within the predetermined radius, the predetermined radius is increased by a factor (e.g., times 1.5).

At S906, the processor identifies the available range for each vehicle. The processor 202 may poll each vehicle to upload a current charge level. The processor 202 determines the available range based on the current charge level. The processor 202 also includes lost charge from the vehicle current location to the user. Alternatively or additionally, the processor 202 may determine the available range based on the last SOC stored in a database/memory of the server.

At S908, the processor 202 identifies an optimal route. The determination is based on the traffic information, weather information, and toll information. For example, the processor 202 identifies the optimal route from a plurality of possible route to minimize travel time.

At S910, the processor 202 determines a base power requirement based on the identified optimal route and the load information. The load information may include a mean of past load information.

At step 912, the processor 202 checks whether any of the identified vehicles have sufficient charge to complete the optimal route. In response to determining that one or more vehicles from the identified vehicles have sufficient charge, the process proceeds to step 924. In response to determining that none of the identified vehicles has sufficient charge, the process proceeds to step 914.

At step 914, the processor 202 ranks the vehicles by available charge. For example, the vehicles based on ascending order of potential charge at the departure location. In other words, the processor decrease/increase the charge of each vehicle based on the estimated charge needed to arrive to the departure location and potential of charging while traveling to the departure location.

At step 916, the processor 202 determines the proximity of each vehicle having sufficient charge to the departure location. At step 918, the processor determines available charging in route for each vehicle. At step 920 a dwell time for each vehicle is determined.

At step 922, the processor 202 optimizes for customer wait time, in-route charging, efficiency, and the like. The enroute charging includes charging during transit to the departure location and during transit from the departure location to the destination. The enroute charging also includes estimation for alternative routes to the departure location and to the destination.

At step 930, the processor 202 identifies the vehicle based on the optimization. The identification may also be based on the user input for example, the user may indicate a driver preference for example autonomous or human driver At step 932, the vehicle moves towards the departure location. The processor may output a signal to the vehicle indicating in-route charging information. At step 934, the vehicle arrives to the location of the customer to pick up the customer.

At step 924, the processor determines the proximity of each vehicle to the departure location. At step 926, the processor determines a dwell time for each vehicle. At step 928, the processor optimizes for customer wait time and minimum dwell time.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for managing recharging of a shared electric vehicle, the method comprising:
   Determining, using processing circuitry, whether an energy storage device of the electric vehicle requires charging based on a present state of charge, an estimated state of charge required to complete a planned route, and a learned margin for state of charge estimation accuracy under given conditions;
   identifying, using processing circuitry, a charging method based on a plurality of parameters including an ambient temperature, a present state of charge, a present load, and a power estimate for a planned route;
   altering the planned route of the electric vehicle to enable charging based on the identified method; and
   charging a second energy storage device associated with a second electric vehicle during transit via the electric vehicle,
   wherein the available charging methods from which a charging method is identified include at least swapping electric vehicles, exchanging the energy storage device, and charging via a charging bot.

2. The method of claim 1, further comprising:
   loading a charged energy storage device to a drone;
   connecting the charged energy storage device to the electric vehicle;
   loading a depleted energy storage device from the electric vehicle to the drone; and
   transporting the depleted energy storage device to a central charging station.

3. The method of claim 1, further comprising:
   receiving a ride request including a destination location; and
   aborting the drive to the destination location when the present state of charge is below a predetermined threshold.

4. The method of claim 1, further comprising:
   determining whether a third electric vehicle outputted a charge request; and
   altering the charging bot route to the third electric vehicle location in response to determining that the third electric vehicle has outputted a charge request, wherein the third electric vehicle location corresponds to an estimated location on a planned route of the third electric vehicle associated with an estimated travel time of the charging bot from the location of the first electric vehicle to the third electric vehicle.

5. The method of claim 1, wherein the electric vehicle is a shared bidirectional electrical vehicle.

6. The method of claim 5, wherein the charging bot couples with the electrical vehicle in a side opposite to a direction of travel.

7. The method of claim 1, wherein the plurality of parameters further includes a dwell time.

8. The method of claim 1, wherein swapping electric vehicles includes:

determining a swapping location based on the electric vehicle present location and estimated average speed;

directing a charged electric vehicle to the swapping location;

matching a speed of the charged electric vehicle and the speed of the electric vehicle;

coupling the electric vehicle with the charged electric vehicle; and decoupling the electric vehicle and the charged electric vehicle when users have transferred from the electric vehicle to the charged electric vehicle.

9. The method of claim 1, wherein the second electric vehicle is a small electric vehicle associated with a user.

10. The method of claim 1, wherein a non-idle charging technique is identified when the electric vehicle is in a trip.

11. A system for managing recharging of an electric vehicle, the system comprising:

a charging bot;

an energy storage device associated with the electric vehicle; and processing circuitry associated with the electric vehicle, the processing circuitry configured to determine whether the energy storage device of the electric vehicle requires charging based on a present state of charge, an estimated state of charge required to complete a planned route, and a learned margin for state of charge estimation accuracy under given conditions, identify a charging method based on a plurality of parameters including an ambient temperature, a present state of charge, a present load, and a power estimate for a planned route, alter the planned route of the electric vehicle to enable charging based on the identified method, and charge a second energy storage device associated with a second electric vehicle during transit via the electric vehicle, wherein the available charging methods from which a charging method is identified include at least swapping electric vehicles, exchanging the energy storage device, and charging via the charging bot.

12. The system of claim 11, wherein the processing circuitry is further configured to:

load a charged energy storage device to a drone;

load a depleted energy storage device from the electric vehicle to the drone; and transport the depleted energy storage device to a central charging station.

13. The system of claim 11, wherein the processing circuitry is further configured to:

receive a ride request including a destination location; and abort the drive to the destination location when the present state of charge is below a predetermined threshold.

14. The system of claim 11, wherein the processing circuitry is further configured to:

determine whether a third electric vehicle outputted a charge request;

alter the charging bot route to the third electric vehicle location in response to determining that the third electric vehicle has outputted a charge request, wherein the third electric vehicle location corresponds to an estimated location on a planned route of the third electric vehicle associated with an estimated travel time of the charging bot from the location of the first electric vehicle to the third electric vehicle.

15. The system of claim 11, wherein the electric vehicle is a shared bidirectional electrical vehicle.

16. The system of claim 15, wherein the charging bot couples with the electrical vehicle in a side opposite to a direction of travel.

17. A non-transitory computer readable medium storing computer-readable instructions therein which when executed by a computer cause the computer to perform a method for charging a shared electric vehicle, the method comprising:

determining whether an energy storage device of the electric vehicle requires charging based on a present state of charge, an estimated state of charge required to complete a planned route, and a learned margin for state of charge estimation accuracy under given conditions;

identifying a charging method based on a plurality of parameters including an ambient temperature, a present state of charge, a present load, and a power estimate for a planned route;

altering the planned route of the electric vehicle to enable charging based on the identified method; and charging a second energy storage device associated with a second electric vehicle during transit via the electric vehicle, wherein the available charging methods from which a charging method is identified include at least swapping electric vehicles, exchanging the energy storage device, and charging via a charging bot.

* * * * *